Figure 1:
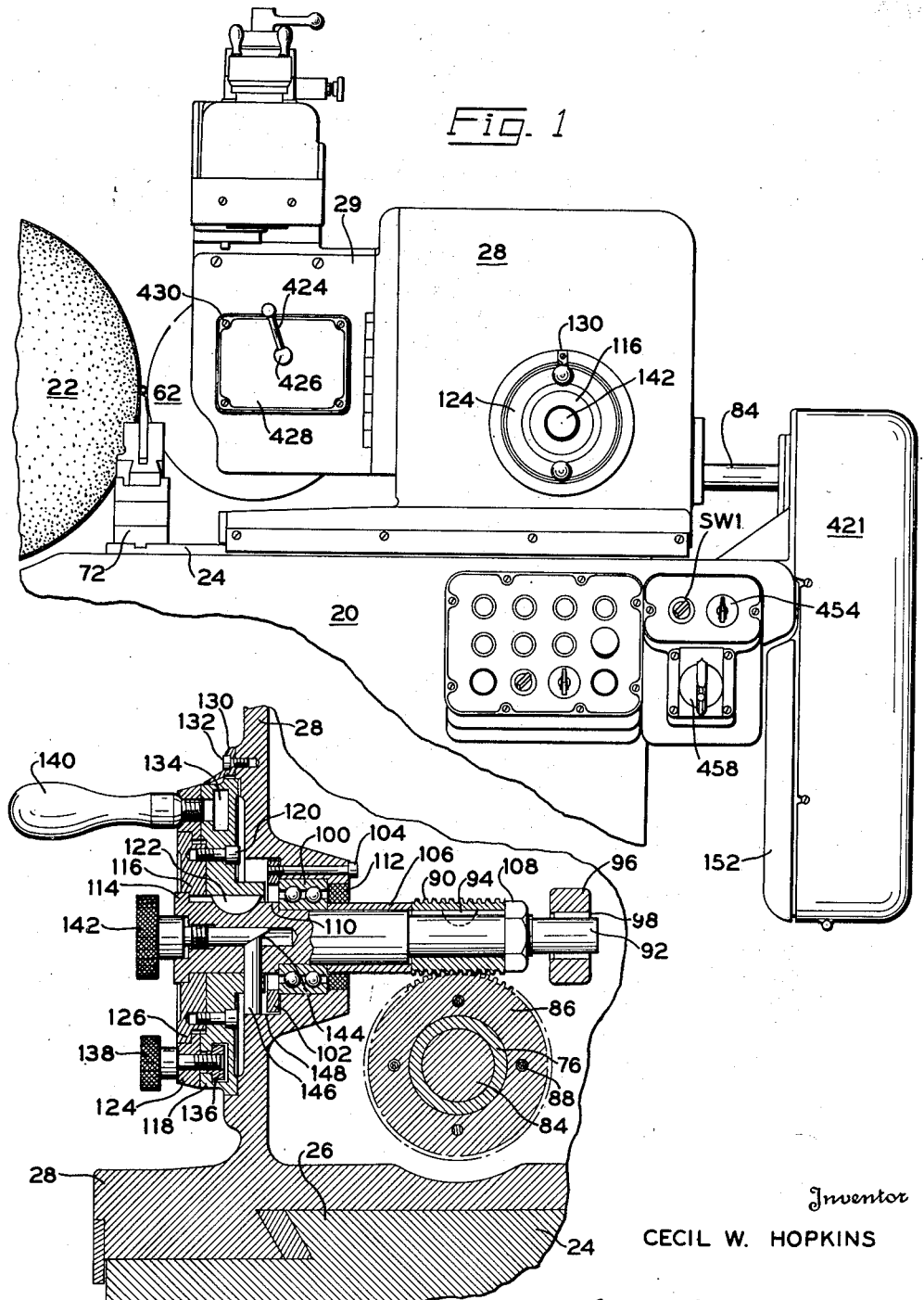

March 25, 1952

C. W. HOPKINS 2,590,102

MACHINE TOOL

Filed Nov. 19, 1948

6 Sheets-Sheet 1

Inventor
CECIL W. HOPKINS

By Strauch & Hoffman
Attorneys

March 25, 1952
C. W. HOPKINS
2,590,102
MACHINE TOOL
Filed Nov. 19, 1948
6 Sheets-Sheet 2
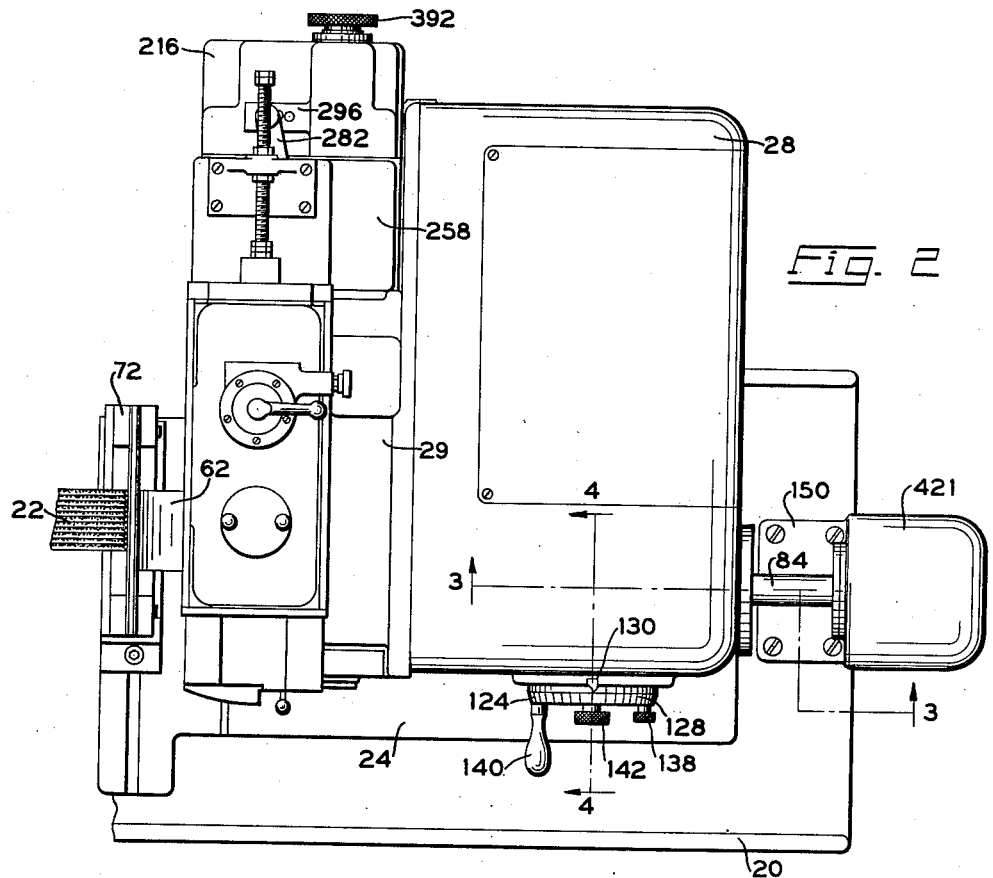
Fig. 2
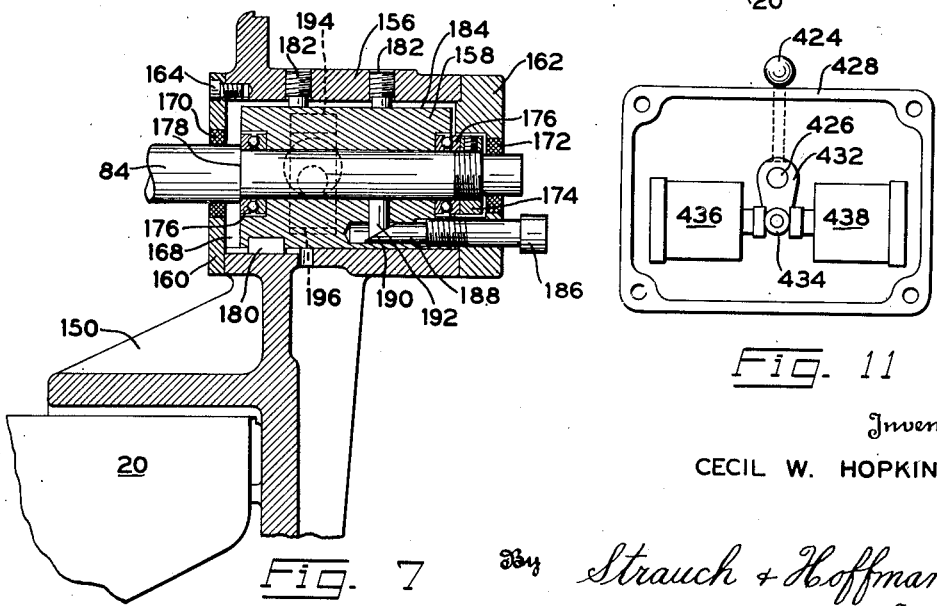
Fig. 7
Fig. 11
Inventor
CECIL W. HOPKINS
By Strauch & Hoffman
Attorneys March 25, 1952 C. W. HOPKINS 2,590,102
MACHINE TOOL
Filed Nov. 19, 1948 6 Sheets-Sheet 3

Inventor
CECIL W. HOPKINS
By Strauch & Hoffman
Attorneys

March 25, 1952   C. W. HOPKINS   2,590,102
MACHINE TOOL
Filed Nov. 19, 1948   6 Sheets-Sheet 4

Inventor
CECIL W. HOPKINS
By Strauch & Hoffman
Attorneys

March 25, 1952 C. W. HOPKINS 2,590,102
MACHINE TOOL
Filed Nov. 19, 1948 6 Sheets-Sheet 5

Inventor
CECIL W. HOPKINS
By Strauch & Hoffman
Attorneys

Inventor
CECIL W. HOPKINS

Patented Mar. 25, 1952

2,590,102

UNITED STATES PATENT OFFICE 2,590,102

MACHINE TOOL

Cecil W. Hopkins, Waynesboro, Pa., assignor to Landis Machine Company, Waynesboro, Pa., a corporation of Pennsylvania Application November 19, 1948, Serial No. 61,018

17 Claims. (Cl. 51—103)

This invention relates to improvements in means for actuating a reciprocating member of a machine tool and has particular reference to automatic infeed mechanism for centerless grinding machines.

The device embodying my invention obviates many of the disadvantages inherent in similar mechanisms now in use. One such disadvantage is the fact that, in the prior art mechanisms, the control wheel is made to rotate continuously, regardless of the movements of the feeding mechanism. This often results in defective work for the reason that the work begins to rotate under influence of the control wheel before the feeding movement has closed the distance between grinding and control wheels far enough to contain the work piece in proper axial alignment, with the result that one end of the work is often thrown in contact with the grinding wheel and damaged. In my invention, the control wheel is caused to start and stop with the infeed movement. This is important especially in the grinding of threads, where the amount of feed for the actual grinding operation is much greater than that for surface grinding. When a thread grinding operation by the infeed method is finished, the work piece must be withdrawn a distance equal to the depth of the thread before it is entirely clear of the grinding wheel, while in grinding a cylinder or the like, the slightest rearward movement of the infeed mechanism clears the work piece from the grinding wheel entirely.

My device has the further advantage of providing a gradually decreasing rate of feed as the grinding operation proceeds. This is also of especial importance in the grinding of threads. At the beginning of a thread grinding operation the amount of actual grinding being done is comparatively very small, and the rate of feed can consequently be large. As the operation proceeds, more and more of the surface of the grinding wheel comes into operation and the feed should be correspondingly slowed.

The hereinafter described automatic infeed device is capable of being disconnected and rendered inoperative when desired for the operation of the machine under manual feed, for dressing the control wheel or for any other reason.

An object of the invention is the provision of improved means for reciprocating a feeding member of a machine tool to effect the proper feeding movement between a work piece and tool.

Another object of the invention is the provision of improved mechanism for automatically reducing the rate of feed as the operation progresses so that the initial advance of the feeding member is quite rapid and the rate of feed gradually approaches zero as the operation nears completion.

A further object is to provide novel means for changing the speed of rotation of the control wheel of a centerless grinding machine according to the method used for carrying out the grinding operation.

Another object is to provide simple and effective means for effecting the proper feeding movement by a combination of electrical and hydraulic systems.

A further object of the invention is to enable the same machine to operate selectively with an automatic feed, a manual feed or no feed at all.

A still further object is the provision of a control circuit which will, among other things, stop the rotation of the control wheel after each feeding operation and which will start rotation of the control wheel at the beginning of each feeding operation.

Figures 3, 5, 6:
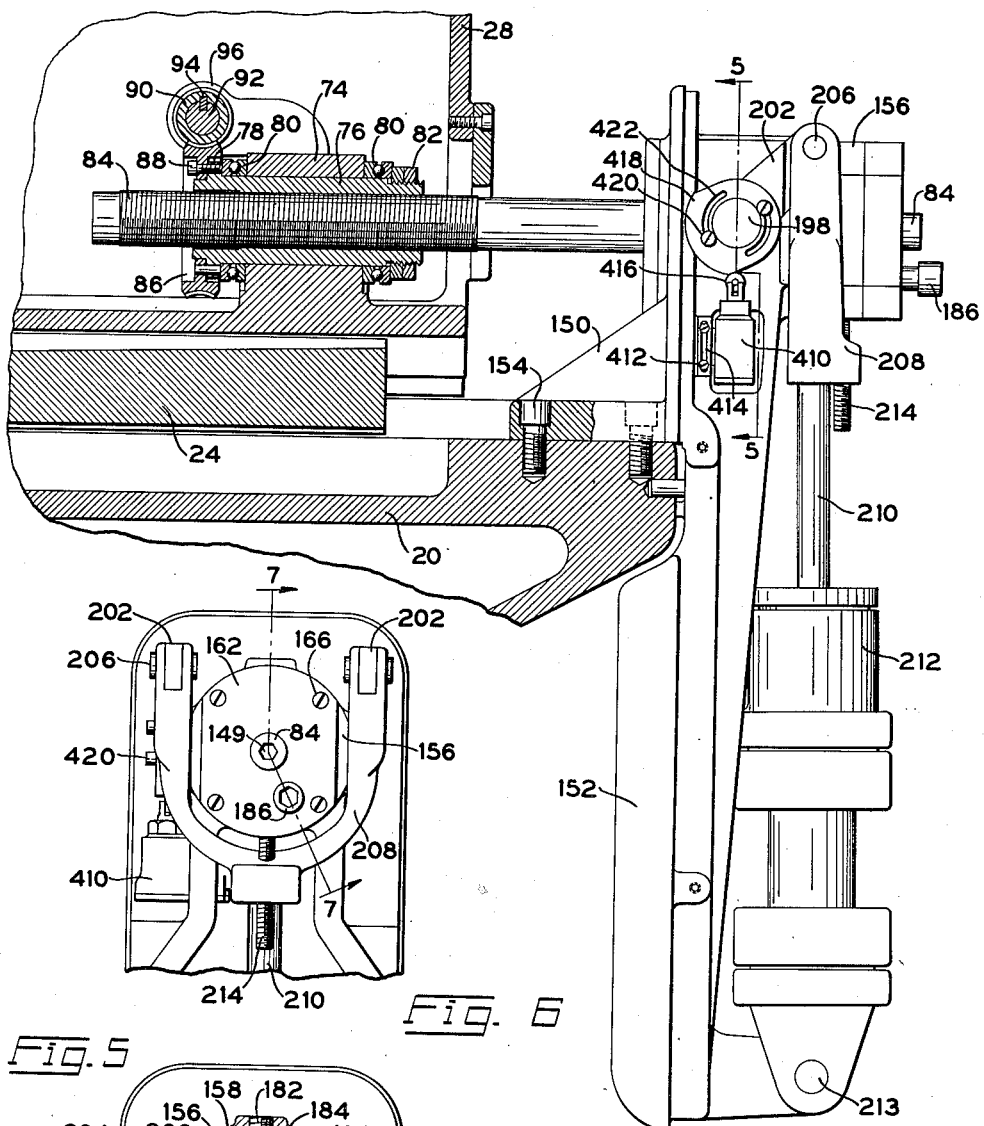
Figure 8:
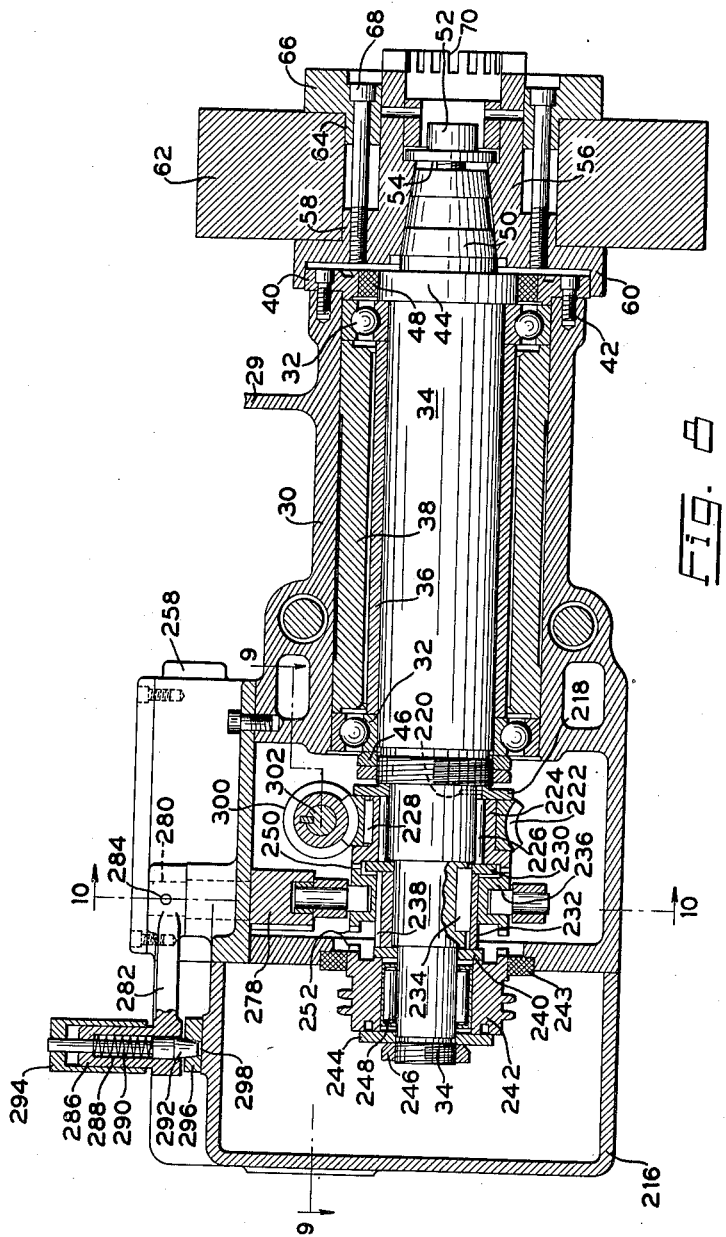
Figures 9, 10:
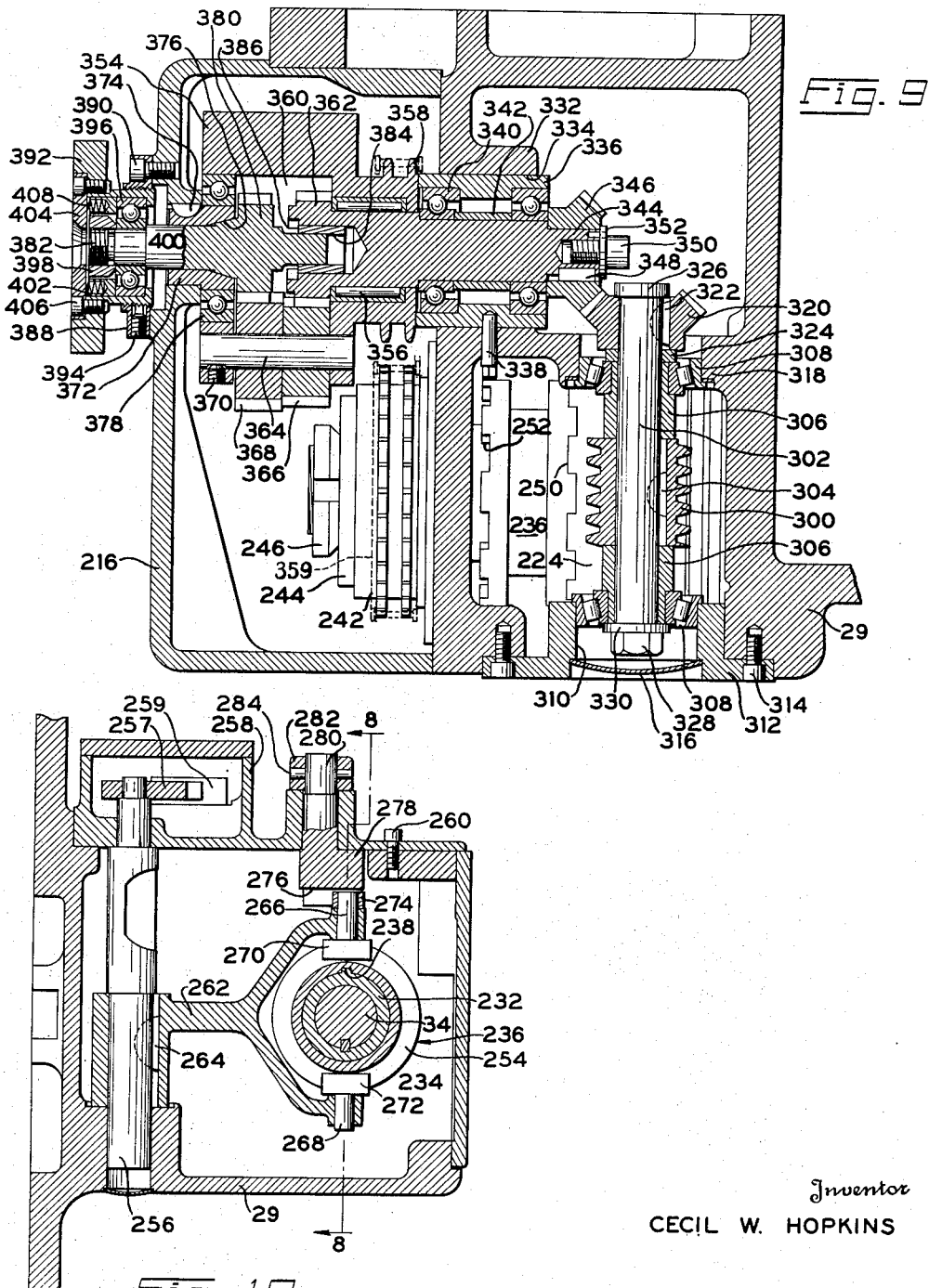
Figure 12:
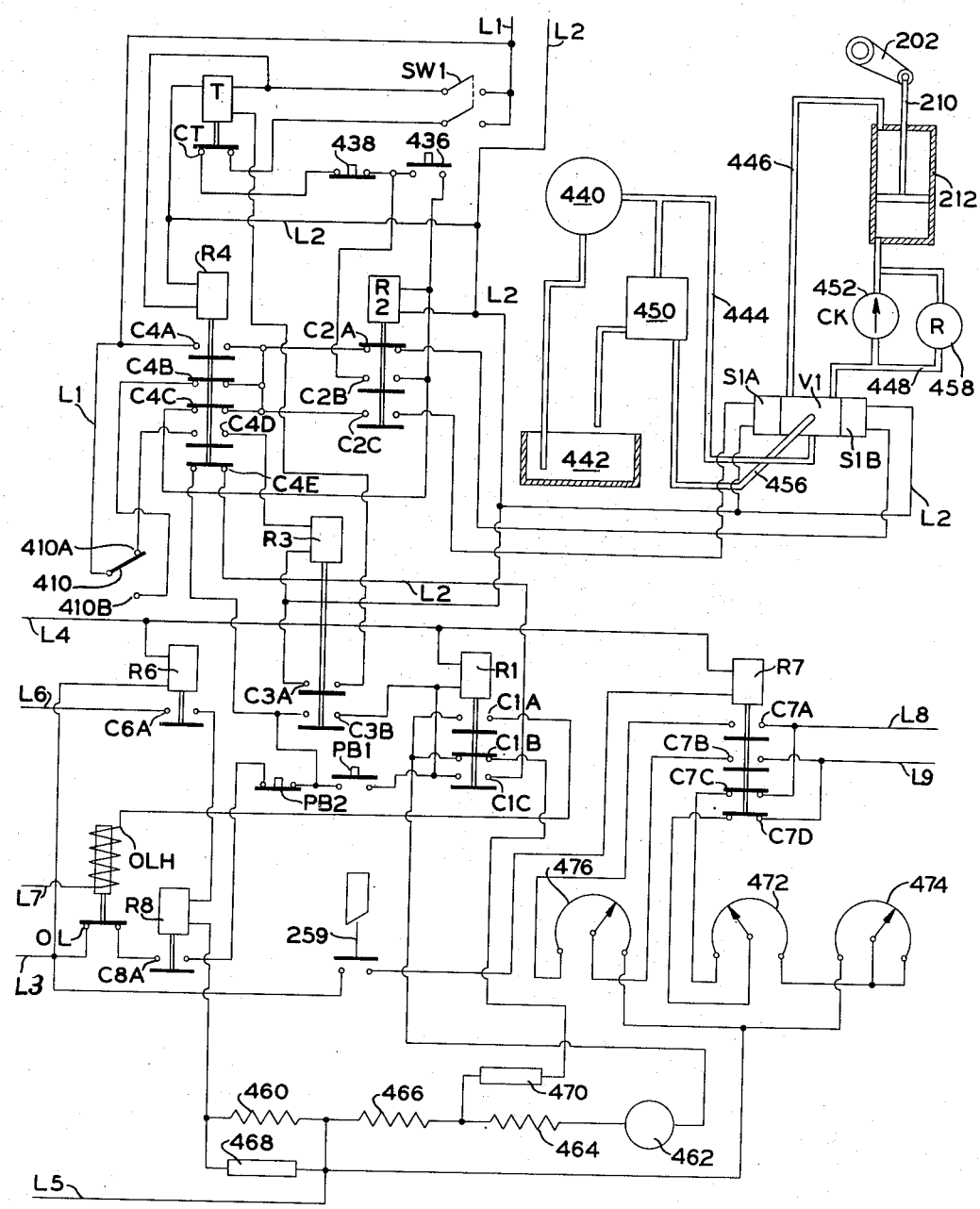

Other objects and advantages will be apparent from the following description of an embodiment of the invention in combination with the accompanying drawings, in which Figure 1 is a partial side elevation of a centerless grinding machine with the improved mechanism applied thereto, Figure 2 is a partial plan view of the machine, Figure 3 is a fragmentary vertical section along line 3—3 of Figure 2, Figure 4 is a fragmentary vertical section along line 4—4 of Figure 2, Figure 5 is a fragmentary vertical section along line 5—5 of Figure 3, Figure 6 is a partial end elevation of the parts shown in Figure 3, Figure 7 is a fragmentary vertical section along line 7—7 of Figure 6, Figure 8 is a fragmentary vertical section along line 8—8 of Figure 10, with certain parts omitted for clarity, Figure 9 is a fragmentary horizontal section on a somewhat enlarged side along line 9—9 of Figure 8, with certain parts omitted for clarity, Figure 10 is a fragmentary vertical section along line 10—10 of Figure 8 with certain parts omitted for clarity, Figure 11 is a detail elevation showing the infeed operating lever, and Figure 12 is a diagram of the electro-hydraulic control circuit for the machine.

The invention is capable of general use for effecting a feeding movement of a reciprocating member or slide and is not to be interpreted as restricted to the use of a centerless grinding machine which has been chosen for purposes of illustration. The invention will accordingly be described in conjunction with the centerless grinding machine shown in the drawings which comprises a bed 20 upon one side of which is supported in the usual manner a grinding wheel 22. A main slide member 24 is mounted upon bed 20 for reciprocation toward and from grinding wheel 22 in a direction perpendicular to the axis of said grinding wheel.

The upper surface of the main slide 24 is formed with a dovetail 26 (Figure 4) which engages a mating recess in the lower surface of a control wheel slide 28 which is thus mounted on main slide 24 for reciprocation relative thereto and also in a direction perpendicular to the axis of grinding wheel 22. As shown in Figure 2, the control wheel slide 28 has secured thereto by means not shown a housing 29. This housing, in which the control wheel is supported, is mounted so that the axis of the control wheel may be adjustably inclined relative to the fixed horizontal axis of the grinding wheel 22. Such mounting means is old in the art and need not be described here. The dresser mechanism for the control wheel, shown in Figures 1 and 2 is not an essential part of the present invention.

The control wheel housing 29 (Figure 8) is provided with a transverse bearing portion 30 in which is mounted, upon ball bearings 32 a control wheel spindle 34. Spacing members 36 and 38 surround spindle 34 and maintain the inner and outer races respectively of bearings 32 in proper spaced apart relation. At the forward end of bearing portion 30, bearing 32 is retained therein by means of a cap member 40 which is secured to portion 30 by screws 42. Spindle 34 is held axially immovable by the engagement of its integral enlarged portion 44 with the forward bearing 32 and by the lock-nuts 46 threadedly engaged on spindle 34 adjacent the rearward bearing 32. A sealing member 48 is provided between enlarged portion 44 and cap member 40 to retain lubricant in the bearing and to prevent the entry of foreign matter, particularly grinding dust.

Forwardly of enlarged portion 44, spindle 34 is formed with a reduced, sharply tapered portion 50 upon which is secured, by means of a screw 52 and washer 54, a control wheel hub 56. At its rear end the hub 56 is formed with a diametrically enlarged portion 58 provided with the external annular flange 60. The part 58 of the hub is fitted within one end of the central circular opening of a control wheel 62 with the flange 60 in abutting contract against the adjacent side face of the wheel. An annular member 64 is telescopically fitted over the other end of the hub 56 and within the opposite end of the opening of the control wheel, said member having a flange 66 for abutting contact against the front face of said wheel. This member 64 is connected with the part 58 of the hub 56 by means of the screws 68, whereby the hub and member 64 are rigidly connected against relative rotation and with their flanges 60 and 66, respectively, in tight clamping contact with the opposite faces of the control wheel 62. The member 56 is also formed with a series of open ended slots or recesses 70, circumferentially spaced apart to constitute the female element of a clutch mechanism.

The aforementioned clutch mechanism may be used when desired to operate the control wheel 62 by manual means as shown in the patent to Arthur Scrivener, No. 2,427,024. Such mechanism is not a part of the present invention and reference is made to the above patent for a description thereof.

Thus it is seen that the control wheel 62 is mounted for rotation on the control wheel slide 28, and is movable toward and from the grinding wheel 22 relative to the main slide 24 and the bed 20. The main slide 24 supports, in the grinding throat between grinding wheel 22 and control wheel 62, a work rest mechanism 72 which may be the same as that shown in the patent to Cecil W. Hopkins, No. 2,417,413, to which reference is made for a complete description of this mechanism. When the position of the work rest 72 relative to grinding wheel 22 has been adjusted by the movement of main slide 24, said slide may be locked in well known manner to slide 28 so that the two slides operate as a unit with control wheel 62 and work rest 72 to feed work pieces toward the grinding wheel in a manner to be described below.

As shown in Figure 3, the control wheel slide 28 is provided in its interior with an upwardly projecting boss 74 in which a feed screw nut 76 is journalled for rotation. Nut 76 is formed with a flange 78 on one end. A pair of thrust bearings 80 are mounted upon nut 76 adjacent the opposite ends of boss 74. The nut 76 and bearings 80 are retained in fixed position axially, relative to boss 74, by means of the flange 78 and a pair of lock nuts 82 threadedly engaged on the opposite end of nut 76. The feed screw 84 is threaded through the nut 76. It will be understood that relative rotation between feed screw 84 and nut 76 will have the effect of moving the slide 28 toward or away from the grinding wheel 22.

A worm wheel 86 is secured to the outer or forward surface of flange 78 by means of screws 88. Worm wheel 86 is in constant mesh with a worm 90 which is mounted upon the shaft 92. A key 94 insures the unitary rotation of worm 90 and shaft 92. Another upstanding boss 96 supports one end of the shaft 92 as seen in Figures 3 and 4. A needle bearing 98 is provided between boss 96 and shaft 92 for the elimination of friction. Shaft 92 extends laterally from boss 96 through the forward wall of slide 28 in which it is supported by a ball bearing 100 (Figure 4). An annulus 102 is secured to the forward wall of slide 28 by means of screws 104 in order to retain bearing 100 in proper axial position. A spacing member 106 is mounted on shaft 92 between bearing 100 and worm 90. Bearing 100, spacer 106 and worm 90 are held against axial movement between a nut 108 threaded upon shaft 92 rearwardly adjacent worm 90 and a forward, enlarged portion 110 of shaft 92. A sealing member 112 is mounted in the wall of slide 28, rearwardly adjacent bearing 100 for the retention of lubricant in said bearing.

Forwardly of portion 110, shaft 92 is further provided with a diametrically enlarged head portion 114 which is received in a recess in the forward surface of a plate 116 which is thus mounted concentrically with shaft 92. A ring member 118 is also mounted on shaft 92 rearwardly of plate 116 to which said ring is secured by screws 120. A key 122 joins ring 118 and shaft 92 for unitary rotation. A second ring member 124 is mounted upon plate 116 for rotation thereabout and is held axially between a shoulder 126 on plate 116 and the forward surface of ring 118. The periphery of ring 124 is beveled and is provided with a suitable scale 128 (Figure 2) for indicating the amount of rotation of said ring 124. A pointer 130 is secured to the wall of slide 28 by a screw 132 to extend adjacent to the scale 128 and thus provide an index point from which the rotation of ring 124 may be measured.

A circular T-slot 134 is formed in the ring 118 to receive a block 136. A manually operated locking screw 138 extends through ring 124 and is threadedly engaged with the block 136 in T-slot 134. By this means, unitary rotation of ring 118 and ring 124 may be achieved by tightening screw 138 or ring 124 may be rotated separately by releasing screw 138. Rotation of ring 124 is accomplished by means of a handle 140 threaded thereinto. A screw 142 is threaded into the center of the forward end of shaft 92 and is provided with a bevel 144 on one side of the inner end thereof to engage the end of a similarly beveled, radially directed pin 146. Pin 146 extends from the center of shaft 92 to the interior surface of a counterbore 148 in the forward wall of slide 28, in which counterbore the annulus 102 is also located. It will be seen that tightening the screw 142 will force pin 146 radially outward to exert a clamping force against the surface of counterbore 148 and thus prevent rotation of shaft 92. The above described mechanism is for the purpose of manually rotating shaft 92 and thus manually feeding the control wheel toward the grinding wheel 22 or withdrawing it therefrom at a slow rate of speed for the fine adjustment of the width of the grinding throat between the grinding and control wheels. For quick, approximate adjustments of relatively greater dimensions, the feed screw 84 may be rotated much more rapidly by the use of a suitable wrench in cooperation with the wrench socket 149 in the extreme rearward end of the feed screw (Fig. 6).

The mechanism for effecting an automatic infeed of the control wheel is more clearly shown in Figures 3, 5, 6 and 7. There it will be seen that a bracket 150 having a large depending portion 152 is mounted upon the right hand edge of bed 20 by means of screws 154. The upper portion of bracket 150 is provided with a large hollow boss 156 in which is mounted for axial sliding movement a cylindrical member 158. The boss 156 is closed at its front and rear ends by the cap members 160 and 162 respectively which are secured to said boss by the screws 164 and 166 respectively. As seen in Figure 7, the cylinder 158 is of less length than boss 156, as indicated by the space 168, to permit limited axial movement of the cylinder between cap members 160 and 162. Sealing members 170 and 172 are mounted for the protection of the mechanism in cap members 160 and 162 respectively and surrounding feed screw 84 which extends through the cap members and cylinder 158.

That portion of feed screw 84 which extends through cylinder 158 is unthreaded except near the rear end thereof where it is threaded to receive a lock nut 174. Thrust bearings 176 are mounted in opposite ends of cylinder 158 to eliminate friction between the rotating screw 84 and the non-rotating cylinder 158. Thrust bearings 176 are retained axially by means of a shoulder 178 and locknut 174 on the shaft 84. The cylinder 158 is held against rotation by a key 180. A pair of set screws 182 are mounted in the boss 156 to engage a flattened surface 184 of cylinder member 158. When tightened, screws 182 prevent axial movement of cylinder 158, as when it is desired to operate the infeed manually. A screw 186 is threaded into the rear end of cylinder 158 and is in abutting contact with a pin 188 which is mounted coaxially therewith in cylinder 158. Pin 188 has a sharply beveled forward end 190 for cooperative engagement with a similarly beveled, radially directed pin 192. Pin 192 extends inwardly into frictional contact with feed screw 84. Screw 186 is loosened when it is desired to effect a rapid adjustment in the position of the control wheel slide 28 by making use of the wrench socket 149 as described above. Screw 186 is tightened to prevent relative rotation between feed screw 84 and cylinder 158 during the use of the automatic infeed mechanism when it is necessary to prevent rotation of the feed screw relative to the nut 76.

Slots 194 are formed in opposite sides of the cylindrical member 158 and have a pair of shoes 196 mounted therein. As seen in Figure 5, space is provided for vertical movement of shoes 196 in slots 194 and within the bore of boss 156. In the sides of boss 156 and in alignment with the slots 194 in cylinder 158 a pair of pins 198 are journalled for rotation. Pins 198 have diametrically reduced eccentric studs 200 which extend inwardly into suitable openings in the shoes 196. Thus, it will be evident, rotation of pins 198 will cause the axial movement of cylinder 158.

A pair of levers 202 are mounted upon the ends of pins 198 protruding from the sides of boss 156. Levers 202 are secured to pins 198 against relative rotation and axial movement by means of a pair of taper pins 204 passing therethrough. Levers 202 extend from pins 198 upwardly and rearwardly and, as shown in Figures 3 and 6, are pivotally connected by pins 206, to opposite sides of a yoke member 208. The two arms of yoke 208 join beneath boss 156 and said yoke is threadedly attached to a piston rod 210 of a hydraulic cylinder 212 which is pivotally mounted at 213 on the depending portion 152 of bracket 150. Operation of hydraulic cylinder 212, therefore, produces a vertical movement of yoke 208 which rocks levers 202, thereby rotating pins 198 and reciprocating cylindrical member 158 which, in turn, reciprocates the control wheel slide 28 and the parts carried thereby. To limit the upward travel of yoke 208 and piston rod 210, a screw 214 is threaded into yoke 208 and abuts the exterior of boss 156. Thus the travel of slide 28 may be adjusted.

As seen in Figure 5 and 7, the shoes 196 are at their lowermost position as are the eccentric studs 200 and the cylinder 158 has been drawn rearwardly to the position seen in Figure 7. It will be apparent that, as studs 200 are rocked forwardly and upwardly from this position by yoke 208 and the axis of said studs approaches a horizontal plane intersecting the axis of screw 84, the constant rotational speed of pins 198 results in a gradually decreasing linear speed of cylinder 158 and consequently of slide 28.

As is generally known in the art, it is necessary to rotate the control wheel at a much slower speed for infeed grinding than for that method of grinding known as through-feed grinding in which the control wheel is not fed toward the grinding wheel but in which the work passes axially between the wheels while the axes of both wheels are maintained stationary. It follows that a machine which is to be used for both methods must include two speed ranges to be selectively applied to the control wheel.

A gear housing 216 for such change speed mechanism is shown in Figure 2 attached to the rear side of the control wheel housing 29. As shown in Figure 8 the spindle 34 extends rearwardly into gear housing 216. Upon said spindle and rearward of locknuts 46 a spacing member 218 is mounted and is keyed to spindle 34 by means of a pin 220. Spacer 218 serves to retain a worm gear 222 upon a hub 224 which is also mounted upon spindle 34. A needle bearing 226 is interposed between spindle 34 and hub 224 while a key 228 provides a driving connection between hub 224 and worm gear 222.

Bearing 226 is restrained at its rearward end by a spacing member 230 which, together with member 232, is mounted upon spindle 34 and is driven therewith by means of a key 234. A clutch collar 236 is positioned upon the bushing member 232 and has a driving connection therewith in the form of a key 238 which is made integral with the bushing member 232. Thus the collar 236 always rotates with spindle 34 but is axially movable relative thereto.

Rearwardly of bushing member 232 another spacer 240 is mounted on spindle 34 followed by a chain sprocket 242 connected by a suitable drive chain with the control wheel motor (not shown). Another spacer 244 and locknut 246 complete the assembly, said lock nut being threaded upon the rearward extremity of spindle 34 to hold all the above mentioned parts in proper axial position. A suitable seal 243 surrounds sprocket 242 to prevent leakage of lubricant from shaft bearing 30 into housing 216. It will be noted that the worm gear hub 224 and the chain sprocket are capable of free rotation, that is, neither part is keyed to the spindle 34. Any axial thrust imposed upon hub 224 is absorbed by the spacers 218 and 230 while the thrust of sprocket 242 is transmitted to spacers 240 and 244. A roller bearing 248 is provided for the friction-free rotation of sprocket 242.

The rearward surface of hub 224 and the forward surface of clutch collar 236 are formed with mating clutch teeth 250 while the rearward surface of collar 236 and the forward surface of sprocket 242 have the mating clutch teeth 252 formed thereon. Thus, it is evident that, since collar 236 is the only one of these three members capable of driving spindle 34, power may be applied to said spindle through either hub 224 or sprocket 242 as desired by selectively engaging either of the clutches 250 or 252 respectively.

Clutch collar 236 is provided with a circumferential groove 254 (Figure 10). A vertical shaft 256 is journalled for rotation in the bottom wall of control wheel housing 29 and in the bottom wall of a switch housing 258 which is secured to the top of control wheel housing 29 by means of screws 260. A yoke 262 is secured to shaft 256 against relative rotation by means of a key 264. Yoke 262 is formed with two arms which straddle the clutch collar 236 and in which are mounted two pins 266 and 268. These pins 266 and 268 are provided with integral rectangular blocks 270 and 272 respectively on their inner ends.

The blocks 270 and 272 are engaged in opposite sides of the groove 254 in clutch collar 236. Thus a rocking movement of yoke 262 about shaft 256 will result in the axial movement of clutch collar 236 to engage the desired clutch teeth as explained above. Such rocking movement of the yoke is accomplished by the following means. The pin 266 extends upwardly from yoke 262 (Figures 8 and 10) and a block 274 is seated thereupon. Block 274 is engaged by a rectangular slot 276 in the lower surface of an enlarged, eccentric portion 278 of a stub shaft 280.

The shaft 280 is journalled for rotation in the switch housing member 258 which also serves to cover partially that portion of control wheel housing 29 occupied by the mechanism described immediately above. A lever 282 is secured to the top end of shaft 280 by means of a pin 284, which also retains the stub shaft 280 in correct axial position. The free end of lever 282 is formed with an upstanding cylindrical extension 286 which is provided with a central bore 288 to receive a spring 290. Spring 290 is retained in bore 288 by a detent 292 having a reduced portion which extends interiorly of the spring and through the top of extension 286 and is frictionally held in or otherwise secured to the top of a hollow handle member 294 which telescopes the extension 286 and may be grasped to raise detent 292 against the pressure of spring 290.

A plate 296 is secured to the top wall of gear housing 216 and is provided with openings 298 which are so positioned as to receive the lower end of detent 292 at the various positions of rotation of lever 282. Thus, it will be apparent that either of the mating clutch teeth 250 or 252 may be engaged by the rotation of handle 282 and that after such selection of the desired clutch engagement, yoke 262 and clutch collar 236 are locked in axial position by the engagement of detent 292 with one of the openings 298. The switch 259 in housing 258 controls a circuit for the control wheel motor as shown in Figure 12 and is actuated to closed position by arm 257 fixed to the upper end of shaft 256 when clutch collar 236 is engaged with the clutch teeth of sprocket 242.

The worm gear 222 is driven by the worm 300 which, as shown in Figure 9 is mounted upon a shaft 302 and is secured for rotation therewith by a key 304. Worm 300 is held in place axially by the shouldered spacing bushings 306 which are journalled in a pair of tapered roller bearings 308, provided for the friction-free support of shaft 302. The forward bearing 308 is contained in an opening 310 in a cover plate 312 which is attached to the forward wall of control wheel housing 29 by means of screws 314. A welch plug 316 is provided to close opening 310 and protect the bearing.

The rearward bearing 308 is mounted in a web structure 318 in control wheel housing 29. A bevel gear 320 is mounted on shaft 302 rearwardly of the rearward bearing 308 and is secured for rotation with said shaft by a key 322. A spacer 324 is provided to locate gear 320 at the proper distance from rear bearing 308. The parts mounted on shaft 302 are held axially by means of the enlarged head 326 of said shaft at the rear end thereof and a nut 328 and washer 330 on the forward end thereof.

On the inner side of the end wall of control wheel housing 29 a boss 332 is formed, having an opening 334 for the support of a bushing 336. A taper pin 338 prevents rotation of the bushing 336 wherein is mounted a pair of ball bearings 340, whose inner races are held in spaced apart relation by a spacing member 342. A shaft 344 is journalled for rotation in bearings 340, the axial direction of shaft 344 being perpendicular to the axis of shaft 302. A bevel gear 346 is mounted on the end of shaft 344 in position to mesh with gear 320 on shaft 302. A key 348 insures unitary rotation between shaft 344 and gear 346 while a screw 350 threaded into the end of shaft 344, together with a washer 352 holds gear 346 axially against the adjacent bearing 340.

On the opposite side of bushing 336 a differential gear housing 354 is mounted upon shaft 344. A needle bearing 356 is provided between shaft 344 and a reduced axial extension of housing 354 having sprocket teeth 358 formed thereon so that power may be applied thereto from the control wheel motor. As shown in Figure 9 the sprockets 242 and 358 are in alignment for connection to the control wheel motor by a common drive chain 359. Housing 354 has a relatively large central opening 360 into which the end of shaft 344 extends. This end of shaft 344 is integrally formed with a spur gear 362. Across the opening 360 a shaft 364 is mounted in the opposite side walls of housing 354, at some distance from the axis of shaft 344 but parallel thereto. Two spur gears 366 and 368 of different ratio are journalled on shaft 364 in fixed relation to each other, the gear 366 being in constant mesh with gear 362. A set screw 370 is threaded through a portion of body 354 to secure shaft 364 against rotation.

In the outer wall of gear housing 216 there is mounted, in alignment with shaft 344, a two-diameter bushing 372 which is secured against rotation by means of a key 374. Bushing 372 is formed with a bore, the inward portion of which is tapered to constitute the female element of a conical friction clutch 376. A bearing 378 is inserted between bushing 372 and the wall of housing 354 to support the latter and to provide for relative rotation between the housing and bushing 372. A sun gear 380 has an integral shaft 382 journalled for rotation and axial sliding movement in bushing 372. This gear is constantly engaged with gear 368. The shaft 382 is formed with the conical male element of the friction clutch 376.

The inner end of shaft 382 extends beyond gear 380 and is received in a pilot bearing sleeve 384 mounted in the adjacent end of shaft 344. This connection insures alignment between shafts 344 and 382. The opposed ends of shafts 344 and 382 are also formed with a shallow two-jaw positive clutch as indicated at 386 so that, when this clutch 386 is engaged, shafts 344 and 382 rotate as a unit.

An annular internally threaded member 388 is secured by screws 390 to the outer wall of gear housing 216 and surrounding and concentric with the shaft 382, which protrudes outwardly therethrough, a flanged nut 392 is threadedly engaged in member 388 and may be secured against rotation as desired by the use of a set screw 394 threaded through member 388 in a radial direction. Nut 392 contains a ball bearing 396 through which shaft 382 is also journalled. A lock nut 398 is threaded upon the extremity of shaft 382 to retain bearing 396 solidly against a shoulder 400 on said shaft. A ring 402 is also seated within nut 392, surrounding locknut 398. A cover plate 404 is secured in the recessed outer side of nut 392 by means of screws 406 to substantially close the bearing receiving opening therein. The ring 402 presses resiliently against the outer race of bearing 396 under the influence of a plurality of springs 408 which are mounted in axially parallel recesses in ring 402 and are held in compression between said ring and cover plate 404.

It will be noted that, when nut 392 is screwed inwardly, shaft 382 is moved axially inward by the engagement of bearing 396 with shoulder 400 on said shaft. It is also evident from the above that such axial advance of shaft 382 is resilient rather than positive due to the presence of springs 408. Such resiliency is necessary to effect the engagement of the jaw clutch 386. When the shaft 382 is withdrawn outwardly by proper rotation of nut 392, clutch 386 is disengaged and the mechanical advantage of the threaded connection between nut 392 and member 388 is utilized to firmly engage the friction clutch 376 whereby shaft 382 is held stationary.

When shaft 382 is held stationary and gear housing 354 is rotated through the integral sprocket 358, gears 366 and 368 on shaft 364 revolve about the stationary sun gear 380 and effect the rotation of gear 362 by gears 368 and 366 at a speed greatly reduced from that of gear housing 354. In such a construction, the gears 366 and 380 would have the same number of teeth while gears 362 and 368 would also have the same number of teeth but slightly more than those of gears 366 and 380. When the clutch 386 is engaged and shafts 344 and 382 rotate as a unit, gears 366 and 368 tend to rotate at different speeds but, since this is impossible, they lock and rotational speed is transmitted directly from gear housing 354 to shaft 344.

Thus two different speeds of shaft 344 are selectively produced by the engagement of jaw clutch 386 or friction clutch 376. As seen above, power from shaft 344 is transmitted through bevel gears 346 and 320, worm 300 and worm gear 222 to hub 224 and, with clutch teeth 250 engaged, through collar 236 to control wheel shaft 34, as shown in Figure 8. The slow speed, of course, is employed in infeed grinding while the faster speed is used when the grinding is to be done by the through-feed method. The extremely fast speed obtained by driving the control wheel directly from the motor through sprocket 242 and clutch 252 is utilized for dressing the control wheel to true its periphery.

The means for automatically controlling the infeed mechanism will now be described. As seen in Figure 3, 5 and 6, a limit switch 410 is secured on one side of the bracket 150 by means of screws 412. The slot 414 through which screws 412 pass permits the location of switch 410 to be adjusted so that the roller 416 thereof is in proper position to be engaged by a cam plate 418 which is mounted on one of the pins 198, exteriorly of the lever 202 as seen in Figure 5. Screws 420 are employed to secure cam 418 to lever 202 for unitary rotation therewith. Screws 420 pass through the arcuate slots 422 which permit the rotary adjustment of cam plate 418 relative to lever 202. Said cam plate can therefore be set to operate switch 410 at any desired point in the rotation of lever 202. The purpose of this switch will appear later in the description.

Preferably, the above described hydraulic actuating means for the feed screw 84 and its control means are enclosed within a protective casing 421 as shown in Figures 1 and 2.

In Figures 1 and 11 is shown a lever 424 mounted upon the exterior end of a shaft 426 which passes through a cover plate 428 secured by screws 430 to the front surface of control wheel housing 29. A second lever 432 is mounted upon the interior end of shaft 426 and is provided on its free end with a roller 434 which depends between the actuating buttons of a pair of switches 436 and 438 mounted one on each side of shaft 426 on the interior surface of cover plate 428. Thus it is apparent that manual rocking of lever 424 causes one or the other of switches 436 or 438 to be actuated.

That portion of the machine control system necessary for the timed operation of the control wheel and infeed mechanism is shown in Figure 12. The remainder of the system, for the operation of all the other various parts and accessories of the machine may be the same as that formerly used for mechanisms of this kind and the novel additions shown in said figure can be attached thereto as understood by those skilled in the art. In Figure 12, the two main lines of the electrical control system are designated L1 and L2 and in the following description it is assumed that the usual circuit connections between these current supply lines and the grinding wheel motor with the customary start and stop switches are provided.

At the beginning of the operation, the control wheel is always located at the position used for through-feed grinding, that is, it is at the limit of its stroke toward the grinding wheel which will be designated herein as the "in" position. In order to introduce a work piece between the grinding and control wheels it is first necessary to withdraw the control wheel to the opposite or "out" end of its travel. This position may be adjusted by manual operation of the worm 98.

With the control wheel at the "in" position, limit switch 410 is closed on its contacts 410A and no others of the relays shown are energized. In the hydraulic portion of the control system, a pump 440 draws hydraulic fluid from a reservoir or tank 442 and discharges it through line 444 to a valve V1. This valve is shifted by opposed solenoids S1A and S1B to deliver fluid under pressure into either of the lines 446 or 448 and thus into either end of hydraulic cylinder 212 to move slide 28 as above described. If more fluid than necessary is pumped into line 444, the excess drains back into tank 442 through relief valve 450 to prevent building up excessive pressures.

To initiate the infeed grinding operation, therefore, with friction clutch 376 and tooth clutch 250 engaged, switch SW1 is closed manually. This causes current to flow through the supply line of an electric timer designated T. This current passes from line L1 through switch SW1 and the timer T to line L2. As is understood in the art there is no immediate consequence of this connection. Closing of switch SW1 also closes a circuit L1—SW1—R4—L2 to energize relay R4.

Energization of relay R4 closes contacts C4A, closing a circuit L1—C4A—C2A—S1B—L2 which energizes solenoid S1B. Solenoid S1B operates valve V1 to allow fluid to pass from line 444 through valve V1, line 448 and check valve 452 into the lower end of cylinder 212. This forces the piston and piston rod 210 upwardly, rocking levers 202 to move control wheel slide 28 outwardly and thus to place the control wheel in the "out" position so that a work piece may be placed in the machine. The upper end of cylinder 212 is at the same time, connected through line 446, valve V1 and line 456 to discharge into tank 442. As control wheel slide 28 moves outwardly the limit switch 410 is operated to open contacts 410A and close contacts 410B. Energization of relay R4 also opens contacts C4B and C4C so the reversal of switch 410 has no immediate effect.

Energization of relay R4 also closes contacts C4D with no effect. Contacts C4E open with no effect unless the control wheel had been rotating previously, in which case the wheel stops as will be explained later.

Next, switch 436 is closed by lever 424 (Figure 11). This closes a circuit

L1—SW1—CT—438—436—R2—L2 energizing relay R2 and closing contacts C2B which are associated therewith, to provide a holding circuit for relay R2 independent of switch 436. The energization of relay R2 also opens contacts C2A, opening the circuit

L1—C4A—C2A—S1B—L2 to deenergize solenoid S1B. Contacts C2C close, closing a circuit L1—C4A—C2C—S1A—L2 to energize solenoid S1A. Solenoid S1A displaces the piston of valve V1 so that fluid from line 444 is permitted to enter line 446, forcing the piston of cylinder 212 downwardly and rocking levers 202 in the clockwise direction as seen in Figure 3, which, as above explained, causes the control wheel slide to move toward the grinding wheel.

Since the speed of this motion will vary with different grinding conditions a means is provided to adjust the speed to the desired value. The lower end of cylinder 212 exhausts through line 448, regulating valve 458, valve V1 and line 456. Regulating valve 458 can be manually set to permit a desired quantity of fluid to pass; thus retarding the speed of the piston in cylinder 212 to the desired value.

At the desired point in the infeeding movement, perhaps just at the contact between grinding wheel, work piece and control wheel, limit switch 410 is operated by cam 418. As explained above, this cam can be adjusted to operate at any desired point in the rocking of lever 202. Limit switch 410 thus opens its contacts 410B and closes contacts 410A, closing a circuit

L1—410A—C4D—R3—L2 energizing relay R3. Energization of relay R3 closes contacts C3A in the control wheel motor control circuit and thus closes a circuit

L3—OL—C8A—PB2—C3B—R1—L4 energizing relay R1. The contacts designated OL are the contacts of a thermal overload relay, the heating element OLH of which is conventionally installed in the control wheel motor power circuit. The contacts C8A are closed by the energization of relay R8 in the control wheel motor power circuit, which relay is the conventional low voltage protection relay for a D. C. motor and which keeps contacts C8A closed at all times while the machine is in operation unless current does not flow through the shunt field 460 of the control wheel motor, in which case relay R8 is also deenergized to open contacts C8A and stop the motor to prevent excessive and dangerous increase in motor speed as is well understood in the art.

The energization of relay R1 closes contacts C1A in the motor power circuit and allows current to flow through the armature 462, commutator field 464 and series field 466 of the control wheel motor. This current is under the control of any electronic D. C. motor starting device of the conventional type and for the proper starting of the motor, the line L5 is connected to the center tap of the anode transformer secondary, while line L6 is connected to the cathodes of the field voltage tubes and line L7 to the cathodes of the armature voltage tubes, all as well understood in the art. To regulate further the speed of the motor, line L8 leads to the voltage regulator tubes and line L9 is connected to the cathode of the voltage control tube, as is also generally understood.

The shunt field 466 is connected in parallel with the conventional field discharge resistance 468, while the usual dynamic brake 470 is connected across the armature 462 and commutator field 464 of the motor. A normally closed contactor C1B is connected in series with the dynamic brake 470 and is opened when relay R1 is energized. Therefore closing of relay R1 produces starting current through the armature 462 and the commutator field 464 while simultaneously releasing the dynamic brake 470 so that the motor starts.

For the grinding operation, the speed of the control wheel motor is governed by the rheostat 472 but limited by a fixed minimum speed for which the series-connected rheostat 474 is set. It is further apparent that, by reason of the above-described method of operation, the control wheel begins to rotate only at the instant it is needed and not before.

Energization of relay R3 also closes contacts C3B which closes the "trip" circuit between timer T and line L2. After a predetermined interval, during which the grinding operation is accomplished, and which interval is set manually at the dial 454 (Figure 1), the timer T will now operate to open the normally closed contacts CT thus interrupting the circuit L1—SW1—CT—438—C2B—R2—L2 and deenergizing relay R2. With relay R2 deenergized, contacts C2C open and deenergize solenoid S1A by opening the circuit L1—C4A—C2C—S1A—L2. At the same time contacts C2A return to their normally closed position and close the circuit L1—C4A—C2A—S1B—L2, energizing solenoid S1B. Energization of S1B, as above explained, effects the prompt withdrawal of the control wheel to "out" position.

This withdrawal again operates limit switch 410 to open contacts 410A and close contacts 410B. This opens the circuit L1—410A—C4D—R3—L2, deenergizing relay R3. Therefore contacts C3B open, breaking the timer trip circuit and resetting the timer contacts CT.

Contacts C3A open, opening the circuit L3—OL—C8A—PB2—C3A—R1—L4 and deenergizing relay R1. This causes the control wheel to stop rotating by opening contacts C1A in the motor armature circuit and by closing contacts C1B in the brake circuit. Thus the control wheel is again withdrawn and stopped to allow removal of the finished work and remains in this position until switch 436 is again operated to repeat the cycle.

When it is desired to change to the through feed grinding process, switch SW1 is opened, opening circuit L1—SW1—R4—L2 and deenergizing relay R4. This causes contacts C4B and C4C to close, closing a circuit L1—410B—C4B—C4C—R2—L2 and energizing relay R2. Contacts C2A open, opening circuit L1—C1E—C2A—S1B—L2 and deenergizing solenoid S1B. Contacts C2C close to close the circuit L2—410B—C4B—C2C—S1A—L2, thus energizing solenoid S1A and returning the slide 28 and the control wheel to the "in" position for through-feed grinding.

It will be seen from Fig. 12 that current through the two rheostats 472 and 474, which control the grinding speed of the control wheel, depends upon the closure of contacts C7C and C7D which are closed when relay R7 is not energized. Relay R7 is energized by the closing of limit switch 259, mentioned above, which closes only when the speed change lever 282 is rotated into the proper position to provide the correct speed for dressing the control wheel. It will also be seen that energization of relay R7 will close contacts C7A and C7B while opening contacts C7C and C7D. The latter pair of contacts then prevent current from passing through rheostats 472 and 474 while the former pair permit current to pass through the rheostat 476 by means of which the speed of the control wheel motor is governed during the dressing operation. Thus an electrical speed increase is added to the mechanical speed increase described above for this operation.

When, as in the case of failure of the timer mechanism to operate properly, it is desirable or necessary to cause the withdrawal of the control wheel without relying on the automatic means described above, the lever 424 may be moved manually to actuate the normally closed switch 438. This has the same result as the opening of the timer contacts CT, and the control wheel is consequently withdrawn from the grinding wheel.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine organization having a tool, means for feeding a work-piece to said tool comprising a reciprocable slide and a work control wheel rotatably mounted thereon, means to support a work-piece between said tool and wheel, an operating motor for said control wheel, hydraulically actuated mechanism operatively connected with said slide to move the same toward and from the tool, electrically actuated means controlling the operation of said mechanism, a circuit therefor, and means operatively controlled by said hydraulically actuated mechanism to connect the control wheel motor in said circuit and initiate rotation of said wheel at a predetermined point in the movement of said slide and wheel in work feeding direction.

2. In a machine organization as defined in claim 1, said mechanism including means for progressively decreasing the rate of feeding movement of the slide after contact of the work piece with the tool.

3. In a machine organization having a tool, a reciprocable slide for feeding a work-piece to said tool, power actuated mechanism operatively connected to said slide to move the same toward and from said tool, said mechanism including a rectilinearly movable member connected with said slide, and eccentric means rotatably engaged directly with said member to impart a rapid initial advancing movement to the slide, followed upon effective contact of the work-piece with the tool, by a progressively decreasing rate of feeding movement of the slide.

4. In a feed mechanism for machine tools, a work feeding slide, and operating mechanism for said slide comprising a feed screw, a nut carried by the slide threadedly engaged with the screw to advance or retract the slide by relative manual rotation of the nut and feed screw, a hydraulic piston and cylinder assembly, a reciprocable cylinder rotatably supporting said feed screw and means restraining said screw against axial movement relative to the cylinder, and eccentric means operable to transmit unitary axial movement to said cylinder and feed screw from said piston and cylinder assembly.

5. Work feeding mechanism for machine tools as defined in claim 4, together with additional manually operable means to releasably secure the said feed screw against rotation relative to said cylinder.

6. In work feeding mechanism for machine tools, a supporting bracket for attachment to the machine bed, said bracket having a housing portion, a shaft extending axially through said housing and adapted to be operatively connected to a work feeding slide mounted on the machine bed, power operated means carried by said bracket, means in said housing for transmitting axial thrust to said shaft to advance and retract the slide comprising eccentric members mounted in opposite sides of the housing wall, and means operatively connecting said power operated mechanism to said eccentric members.

7. Work feeding mechanism for machine tools as defined in claim 6, wherein said power operated means comprises an hydraulic piston and cylinder assembly pivotally mounted on said bracket.

8. Work feeding mechanism for machine tools as defined in claim 6, wherein said thrust transmitting means further comprises a supporting member for said shaft slidably keyed to the housing wall, and thrust transmitting elements carried by the eccentric members and slidably engaged in grooves in opposite sides of said supporting member.

9. Work feeding mechanism for machine tools as defined in claim 8, in which said shaft is rotatably mounted in said supporting member and has a threaded portion for connection with the slide, together with means mounted on said supporting member for releasably securing said shaft against rotation relative to said member.

10. In a centerless grinding machine having peripherally opposed grinding and control wheels and a work support in the grinding throat between said wheels, an operating motor for the control wheel, and driving connections between said motor and the control wheel including selectively operable means to transmit rotation to said wheel at a maximum wheel dressing speed, or at a comparatively low speed for in-feed grinding of a work-piece, or at a relatively higher intermediate speed for through-feed grinding of the work-piece.

11. A centerless grinding machine as defined in claim 10, wherein said selectively operable means comprises a shaft drivingly connected to the control wheel, a differential gear housing rotatably journalled on said shaft and drivingly connected with the motor, planetary differential gearing in said housing including a sun gear and manually operable means for axially shifting said gear, and means operable in one axially shifted position of said gear to restrain the same against rotation and transmit rotation from the housing to said shaft through said gearing at relatively low speed, and, in another axially shifted position of said sun gear, to connect said gearing and shaft for unitary rotation with the housing at relatively high speed.

12. In a centerless grinding machine, a grinding wheel, a work feeding slide and a work control wheel mounted on said slide in peripherally opposed relation to the grinding wheel and means for supporting a work-piece between said wheels; an operating motor for the control wheel, a drive shaft for said wheel, axially spaced driven members rotatably journalled on said shaft, manually operable means to selectively establish a driving connection between said members and said shaft, means for driving said members at relatively different speeds including a common driving connection with said motor, hydraulically actuated infeeding mechanism operatively connected with said slide, an electrical control circuit for said mechanism, means for connecting said motor in said circuit at a predetermined point in the feeding movement of the slide to drive the control wheel at low speed by one of said members, an independent energizing circuit for said motor, switch means in said circuit, and means operatively connected with said manually operable means to actuate said switch means to circuit closing position when the other of said driven members is drivingly connected with the control wheel shaft to drive the control wheel at relatively high speed.

13. In a method of grinding a screw thread on a work-piece in a centerless grinding machine having an abrasive grinding wheel provided with thread grinding ribs and a peripherally opposed work control wheel forming a grinding throat; supporting a work piece in the grinding throat between said wheels and in contact with the periphery of the stationary control wheel, rotating the grinding wheel at relatively high speed, feeding the stationary control wheel toward the grinding wheel to establish contact of the work-piece with the thread grinding ribs and then rotating the control wheel at relatively low speed, and thereafter continuing the feeding movement of the relatively rotating control wheel and work-piece at progressively decreasing speed toward the grinding wheel for a distance substantially equal to the full depth of the thread grinding ribs.

14. In a machine organization having a tool, a reciprocabel slide and a work control member movably mounted on said slide, a work-piece support mounted between said tool and control member, an operating motor for said control member, power actuated mechanism operatively connected with said slide to move the same toward and from the tool, an electrical control system for said mechanism including a circuit, and a switch operatively controlled by said power actuated mechanism to connect said motor in said circuit and initiate operation of said work control member relative to the slide of a predetermined point on the unitary movement of said slide and member in work feeding direction.

15. In a machine organization as defined in claim 14, said mechanism including directly coacting, relatively movable elements for progressively decreasing the rate of feeding movement of the slide after contact of the work-piece with the tool.

16. A centerless grinding machine having peripherally opposed grinding and control wheels and a work support in the grinding throat between said wheels, an operating motor for the control wheel, and driving connections between said motor and the control wheel including differential gearing embodying relatively shiftable gear elements for selectively operating said gearing to drive the control wheel at a low speed for in-feed grinding of a work-piece or at a higher speed for through-feed grinding of a work-piece, and said driving connections comprising additional mechanism operable to drivingly connect said wheel with the motor independently of said differential gearing to drive said wheel at a maximum dressing speed.

17. In a feed mechanism for machine tools, a work feeding slide, operating mechanism for said slide comprising a feed screw, a nut carried by the slide threadedly engaged with the screw to advance or retract the slide by relative manual rotation of the nut and feed screw, a power operated unit, and operating connections between said unit and feed screw including a reciprocable cylinder rotatably supporting said feed screw, mounting means for said cylinder in fixed spaced relation from said slide and a device actuated by said power operated unit and coacting with said cylinder to transmit unitary axial movement to said cylinder and feed screw relative to said mounting means.

CECIL W. HOPKINS.

REFERENCES CITED

The following references are of record in the file of this patent:

UNITED STATES PATENTS

| Number | Name | Date |
| --- | --- | --- |
| 1,814,209 | Einstein | July 14, 1931 |
| 1,842,375 | Einstein | Jan. 26, 1932 |
| 1,998,603 | Archea | Apr. 23, 1935 |
| 2,101,383 | Asbridge | Dec. 7, 1937 |
| 2,113,367 | Belden et al. | Apr. 5, 1938 |
| 2,116,794 | La Fleur | May 10, 1938 |
| 2,364,300 | Koplin et al. | Dec. 5, 1944 |
| 2,427,283 | Hopkins et al. | Sept. 9, 1947 |
| 2,448,551 | Schroeder | Sept. 7, 1948 |